United States Patent [19]

Tamura et al.

[11] Patent Number: 5,047,497

[45] Date of Patent: Sep. 10, 1991

[54] WATER-IN-OIL EMULSION PROCESS FOR PRODUCING AN AROMATIC POLYCARBONATE

[75] Inventors: Mitsuhiko Tamura; Isao Akihara, both of Kitakyushu, Japan

[73] Assignee: Mitsubishi Kasei Corporation, Tokyo, Japan

[21] Appl. No.: 506,093

[22] Filed: Apr. 9, 1990

[30] Foreign Application Priority Data

Dec. 27, 1989 [JP] Japan .................................. 1-338993

[51] Int. Cl.$^5$ ............................................. C08G 64/20
[52] U.S. Cl. .................................... 528/199; 528/171; 528/174; 528/196; 528/198
[58] Field of Search ................ 528/199, 198, 196, 171, 528/174

[56] References Cited

U.S. PATENT DOCUMENTS 4,368,315 1/1983 Sikdar .................................. 528/199
4,384,108 5/1983 Campbell et al. .................. 528/199

*Primary Examiner*—Harold D. Anderson
*Attorney, Agent, or Firm*—Oblon, Spivak, McClelland, Maier & Neustadt

[57] ABSTRACT

A process for producing an aromatic polycarbonate in a water-in-oil emulsified form, having an improved heat stability during molding at a high temperature, is described. In the process according to the present invention, a tertiary amine is added to the water-to-oil emulsion after the average diameter of liquid droplets of the water phase is reduced to not more than 10μm. The polycarbonate obtained by the process of the present invention is improved in heat stability and can provide a molded article with less coloration.

25 Claims, 1 Drawing Sheet

Fig. 1

WATER-IN-OIL EMULSION PROCESS FOR PRODUCING AN AROMATIC POLYCARBONATE

BACKGROUND OF THE INVENTION

The present invention concerns a process for producing an aromatic polycarbonate and, more in particular, it relates to a process for producing a high molecular weight aromatic polycarbonate with less coloration during molding at high temperature.

As a process for producing an aromatic polycarbonate, there has been known a process for producing a high molecular weight aromatic polycarbonate by reacting an aqueous alkali solution of a dihydric phenol and phosgene in an organic solvent thereby forming a low molecular weight polycarbonate oligomer having chloroformate groups (—OCOCl) and then polymerizing the oligomer in a highly emulsified state (Japanese Patent Publication No. 37-2198). The process has a merit capable of rapidly forming a high molecular weight aromatic polycarbonate, but the separation of water layer from organic layer, which is done in order to remove the water poluble impurity from a polymer solution, is too difficult, because an extremely stable emulsified state is formed. In addition, molding conditions for the polymer produced by this method are restricted since the resultant polymer shows poor heat stability and suffers from coloration upon molding at high temperature even after sufficient washing for purification.

Further, there has been known a method of using a tertiary amine as a catalyst upon polycondensation (refer to U.S. Pat. No. 3,775,601). However, although a high molecular weight aromatic polycarbonate can be obtained easily by usual stirring in this process, the tertiary amine reacts with the chloroformate to form thermally instable urethane bonding and, accordingly, the polymer suffers from coloration upon molding at high temperature and products with good color can not be obtained.

SUMMARY OF THE INVENTION

The present invention provides a process for producing a high molecular weight polycarbonate with less coloration during molding.

That is, the feature of the present invention resides in a process for producing an aromatic polycarbonate which comprises the steps of:

forming a low molecular weight polycarbonate oligomer having chloroformate groups by subjecting an aqueous alkali solution of a compound having two phenolic hydroxyl groups and phosgene to reaction in an organic solvent, and polymerizing the oligomer in a water-in-oil emulsified state in the presence of an alkali and a tertiary amine, the tertiary amine being added into the water-in-oil emulsion after the average diameter of liquid droplets of the dispersed water phase in the water-in-oil emulsion is reduced to not more than 10 μm.

According to the present invention, a solution of a high molecular weight polycarbonate after polymerization can easily be purified and a high molecular weight aromatic polycarbonate with less coloration during molding at high temperature can be obtained.

BRIEF DESCRIPTION OF THE DRAWINGS

In FIG. 1, 1 represents a supply device of the oligomer solution, 2 is a supply device of methylene chloride, 3 is a supply device of 1.2N sodium hydroxide solution, 4 is a first emulsifying equipment, 5 is a second emulsifying equipment (TK pipeline homomixer 2S model), 6 is a supply device of 2 wt % triethylamine aqueous solution, 7 is a first polymerization vessel, 8 is a second polymerization vessel, and 9 is a washing step.

DETAILED DESCRIPTION OF THE INVENTION

The compound having two phenolic hydroxyl groups (dihydric phenol) used in the present invention can include bis(hydroxyaryl)alkanes such as
bis(4-hydroxyphenyl)methane,
1,1-bis(4-hydroxyphenyl)ethane,
2,2-bis(4-hydroxyphenyl)propane (hereinafter referred to as bisphenol A),
2,2-bis(4-hydroxyphenyl)butane,
2,2-bis(4-hydroxyphenyl)octane,
1,1-bis(4-hydroxyphenyl)phenylethane,
2,2-bis(4-hydroxy-3-methylphenyl)propane,
2,2-bis(4-hydroxy-3,5-dimethylphenyl)propane,
2,2-bis(4-hydroxy-3-t-butylphenyl)propane,
2,2-bis(4-hydroxy-3-bromophenyl)propane,
2,2-bis(4-hydroxy-3,5-dibromophenyl)propane and
2,2-bis(4-hydroxy-3,5-dichlorophenyl)propane;
bis(hydroxyaryl)cycloalkanes such as
1,1-bis(4-hydroxyphenyl)cyclopentane,
1,1-bis(4-hydroxyphenyl)cyclohexane and
1,1-bis(4-hydroxy-3-methylphenyl)cyclohexane;
dihydroxydiaryl ethers such as
4,4'-dihydroxydiphenyl ether and
4,4'-dihydroxy-3,3'-dimethyldiphenyl ether;
dihydroxydiaryl sulfides such as
4,4'-dihydroxydiphenyl sulfide and
4,4'-dihydroxy-3,3'-dimethyldiphenyl sulfide;
dihydroxydiaryl sulfoxides such as
4,4'-dihydroxydiphenyl sulfoxide and
4,4'-dihydroxy-3,3'-dimethyldiphenyl sulfoxide; and
dihydroxydiaryl sulfones such as
4,4'-dihydroxydiphenyl sulfone and
4,4'-dihydroxy-3,3'-dimethyldiphenyl sulfone.

They may be used alone or as a mixture of two or more of them. It is also possible to form a branched polycarbonate by the combined use of a compound having three phenolic hydroxyl groups such as fluoroglycine, 1,1,1-tris(4-hydroxyphenyl)ethane and a,a',a''-tris(4-hydroxyphenyl)-1,3,5-triisopropylbenzene in an appropriate amount.

These dihydric phenols are used being dissolved or dispersed in an aqueous alkali solution. As the alkali, there can be mentioned an alkali metal hydroxide such as sodium hydroxide and potassium hydroxide, sodium hydroxide being particularly preferred. The molar ratio of the dihydric phenol to the alkali is preferably 1:1.5 to 3.5 and the concentration of the dihydric phenol in the aqueous solution or dispersion is preferably from 5 to 15% by weight. For preventing oxidative coloration of the dihydric phenol, a reducing agent such as sodium sulfite or sodium dithionite may be added as an antioxidant.

The organic solvent used in the reaction with phosgene and polymerization is such an organic solvent as is substantially insoluble to water, inert to the reaction and capable of dissolving a polycarbonate. Specifically, there can be mentioned chlorinated aliphatic hydrocarbon such as methylene chloride, chloroform, dichloroethane and tetrachloroethane; and chlorinated aromatic hydrocarbon such as chlorobenzene, dichlorobenzene and chlorotoluene, methylene chloride being preferred from an industrial point of view. Further, a mixture of the above-mentioned solvent with other organic solvent such as dioxane, tetrahydrofuran, toluene, cyclohexane or n-heptane may also be used.

For controlling the molecular weight of the resultant polycarbonate, a monofunctional compound is usually added as a molecular weight modifier. Specifically, there can be mentioned a monohydric phenol such as phenol, p-cresol and p-t-butyl phenol, a chloroformate thereof, an aromatic monocarboxylic acid chloride such as benzoyl chloride and p-toluyl chloride.

As a method of obtaining a low molecular weight polycarbonate oligomer through the reaction of the dihydric phenol with phosgene by introducing phosgene into reaction mixture, a well-known method may be employed. For example, there can be mentioned a method of introducing phosgene into a mixture of an aqueous alkali solution of the dihydric phenol and an organic solvent immiscible therewith under stirring and reacting them (refer to Japanese Patent Publication No. 37-2198), a method of introducing an aqueous alkali solution of the dihydric phenol and an organic solvent into a tubular reactor, thereby forming a mixed phase stream, then introducing phosgene and reacting them (refer to Japanese Patent Publication No. 46-21460), a method of supplying an aqueous alkali solution, an organic solvent and phosgene to a cooled recycled reaction mixture so that the dihydric phenol has a specific concentration and reacting them (refer to Japanese Patent Laid-Open (KOKAI) No. 62-267324), etc. Phosgene may be introduced in any of the forms of liquid gas or a solution of an organic solvent. The amount of phosgene is usually from 1.05 to 1.4 mol to one mol of the dihydric phenol. Further, the monofunctional compound for controlling the molecular weight may be added in the reaction with phosgene but it is preferably added after the completion of the reaction with phosgene or during the polymerization reaction since the resultant low molecular weight compound formed by the reaction of the monofunctional compound and phosgene evolves gaseous materials or causes deposit on a molding die upon molding.

In the present invention, after forming a low molecular weight polycarbonate oligomer (the degree of polymerization of 1 to about 10) having the chloroformate groups by the reaction with phosgene, the resultant oligomer is formed into a water-in-oil emulsion under the presence of an alkali and the low molecular weight polycarbonate oligomer is polymerized to a high molecular weight polycarbonate while maintaining the emulsified state. As the alkali used herein, there can be mentioned an alkali metal hydroxide such as sodium hydroxide or potassium hydroxide as used in the reaction with phosgene described above.

Further, the concentration of the chloroformate group in the low molecular weight polycarbonate oligomer is preferably in the range of $800 \times 10^{-6}$ to $2000 \times 10^{-6}$ eq/g based on the oligomer.

When emulsifying the oligomer solution reacted with phosgene, it is possible to remove an aqueous phase from the liquid reaction mixture after the reaction with phosgene by allowing the mixture to stand or applying centrifugal separation and additionally add alkali metal hydroxide to the resultant solution of the low molecular weight polycarbonate oligomer in an organic solvent, or the liquid reaction mixture containing two phases after the reaction with phosgene containing the low molecular weight polycarbonate oligomer may be emulsified as it is.

In the process of the present invention, the water-in-oil emulsified state is preferably made by using a high speed agitating equipment described below. More preferably, the water-in-oil emulsified state is made by removing the water phase from the liquid reaction mixture after the reaction with phosgene and then supplying the resultant organic solution containing the low molecular weight polycarbonate oligomer and an aqueous solution of an alkali to the high speed agitating equipment. In this case, the water-in-oil emulsified state can be made nearly immediately after supply into the high speed agitating equipment. In case of using a plurality of equipments in combination, the time required for attaining the water-in-oil emulsified state by high speed agitating is totally several seconds at the longest.

For maintaining a satisfactory emulsified state during the polycondensation reaction, the ratio between the aqueous phase and the organic phase in the reaction system is preferably from 0.05 to 1.0 by volume of the aqueous phase to the unit volume of the organic phase. Further, the polycarbonate oligomer concentration in the organic solvent is from 8 to 30% by weight and, preferably, from 10 to 25% by weight.

Upon conducting polymerization, the solution of the low molecular weight polycarbonate oligomer obtained in the reaction with phosgene in an organic solvent may be diluted further with an addition of an organic solvent (diluent solvent). The diluent solvent is selected from those solvents as described above for the organic solvent for the reaction with phosgene.

In the present invention, it is necessart to add the tertiary amine which acts as the polymerization catalyst after forming a specific highly emulsified state in order to prevent the reaction between the tertiary amine and the chloroformate group in the low molecular weight polycarbonate oligomer.

The highly emulsified state referred to in the present invention means a water-in-oil type emulsion formed from a solution of the low molecular weight polycarbonate oligomer in an organic solvent and an aqueous alkali solution, in which the average diameter of liquid droplet of the aqueous phase as the dispersed phase is not more than 10 μm. The average diameter of the liquid droplet can be measured, for example, by using a laser diffraction type dispersion analyzer (SALD 1100, manufactured by Shimazu Seisakusho).

In such a highly emulsified state, an aromatic polycarbonate of a sufficiently high molecular weight can be obtained within several hours, usually, within two hours without addition of the tertiary amine as the polymerization catalyst, but when no tertiary amine is added, there is a drawback that the separation after polymerization cannot be done and so washing for purification is too difficult to be done.

As a method of emulsifying the liquid mixture for polymerization, there are a method of high speed stirring, and a method of adding an aqueous alkali solution under stirring, etc. Although it is possible to attain a desired emulsified state by using a simple stirrer (paddle, propeller, turbine, etc.) at an extremely high rotational speed, high speed agitating equipments such as a homogenizer and homomixer, a colloid mill, orifice mixer, flow jet mixer, ultrasonic emulsifier, etc. are preferred as a device for obtaining the highly emulsified state required in the present invention. Use of such a device is particularly effective, since a highly emulsified state of more minute liquid droplet diameter can be obtained as compared with the emulsified state obtained by using a simple stirrer. There is, of course, no particular restriction to the method of emulsification in the present invention so long as the average diameter of the liquid droplets of the dispersed aqueous phase can be reduced to not more than 10 $\mu$m, and a method of using the high speed agitating equipment, a method of using the simple stirrer or a combined use thereof may properly be employed.

A plurality of agitating equipments of the same type in combination may be also employed.

In the conventional known method, polymerization is carried out by adding the tertiary amine as the catalyst under normal stirring, or the polymerization is carried out in a highly emulsified state without using the catalyst.

On the other hand, in the present invention, the catalyst such as the tertiary amine is not substantially added until a desired highly emulsified state is attained, but the tertiary amine is added at the time when or after a highly emulsified state in which the average diameter of the liquid droplets of the aqueous phase as the dispersed phase is not more than 10 $\mu$m, preferably 0.01 to 10 $\mu$m is attained by the mechanical method as described above, followed by polymerization, to complete the polymerization.

If the tertiary amine is added in a state where the average diameter of the liquid droplet of the aqueous phase is larger than 10 $\mu$m, a large amount of tertiary amine is brought into reaction with the chloroformate group remained on the terminal end of the oligomer or the growing polymers having intermediate molecular weight and resulted in to make thermally unstable urethane bondings and that bonding is incorporated into the polymer terminal, which may causes coloration of the polycarbonate during molding at a high temperature and, accordingly, is not favorable.

Further, in the highly emulsified state according to the present invention, the amount of the chloroformate group remaining in the oligomer throughout the emulsifying equipment is preferably not more than $600 \times 10^{-6}$ eq/g. If the emulsification is insufficient, the value usually exceeds $600 \times 10^{-6}$ eq/g and, sometimes, $700 \times 10^{-6}$ eq/g. If the tertiary amine as the catalyst is added in such a state, the amount of the tertiary amine incorporated into the polycarbonate terminal is increased and, in addition, a predetermined molecular weight can not sometimes be attained if the amount of the catalyst is increased.

On the other hand, in an emulsified state in which the average diameter of the liquid droplet is not more than 10 $\mu$m, the concentration of the residual chloroformate group may sometimes reaches the value as low as $100 \times 10^{-6}$ to $300 \times 10^{-6}$ eq/g depending on the concentration of the aqueous alkali solution, the amount of supplied energy upon emulsification, etc. It is of course possible in the present invention to add the tertiary amine in such a state.

In the process of the present invention, it is preferred to add the tertiary amine to the oligomer having a chloroformate concentration of $100 \times 10^{-6}$ to $600 \times 10^{-6}$ eq/g.

The emulsified state after passing through an emulsifying equipment varies depending on the energy supplied by the emulsifying equipment and also it significantly depends on the concentration of the oligomer solution, the concentration of alkali metal hydroxide in the aqueous alkali solution, the ratio between the aqueous phase and the organic phase, etc. These conditions function in the state of emulsion not independently of each other but in a combined manner.

The concentration of the oligomer in an organic solution thereof (including diluent solvent if used) supplied to an emulsifying equipment is so adjusted that the concentration of the polycarbonate to be produced falls within the range from 8 to 30% by weight, more preferably, from 10 to 25% by weight.

The concentration of alkali in the aqueous alkali solution is determined depending on the ratio of the aqueous phase to the organic phase, and the concentration of the aqueous alkali solution is preferably from 0.5 to 4N and, more preferably, from 0.7 to 2.5N. If the concentration is too low, it is not preferred since the emulsion is not easily stabilized.

The ratio between the aqueous phase and the organic phase is an important factor affecting on the emulsified state and a range of the aqueous phase from 0.05 to 1.0, preferably, from 0.1 to 0.8 by volume to the unit volume of the organic phase is suitable since the aqueous phase is to be a dispersed phase.

In the present invention, when the average diameter of the liquid droplet of the dispersed aqueous phase is not more than 10 $\mu$m, the polymerization rate abruptly increases. By adding the tertiary amine, only the polymerization reaction is remarkably accelerated due to the catalytic effect of the tertiary amine to attain a predetermined molecular weight within a short time. On the other hand, since the rate of forming urethane bonding by the reaction between chloroformate group and the tertiary amine does not so much depend on the emulsified state, it is considered that, the amount of the urethane bonding at the terminals are remarkably decreased as a result.

In the process according to the present invention, the tertiary amine can be added by any method, specifically, after passing through an emulsifying equipment and reaching to the desired emulsified state. For instance, it can be added just after the emulsified mixture is formed through emulsifying equipment or after holding the reaction mixture in a high emulsified state in a stirring vessel for an appropriate period after passing through the emulsifying equipment, etc. In a case where the concentration of the chloroformate group in the low molecular weight polycarbonate oligomer to be supplied to the emulsifying equipment is high, the concentration of chloroformate group may sometimes be over $600 \times 10^{-6}$ eq/g near the exit of the emulsifying equipment even after the emulsified state in which the average diameter of the liquid droplets of the dispersed aqueous phase is not more than 10 $\mu$m is attained. If the tertiary amine is added in such a state, the amount of the tertiary amine incorporated into the terminals may possibly be increased. It is preferred in this case to store the emulsion for an appropriate period of time, since the concentration of chloroformate group is reduced to not more than $600 \times 10^{-6}$ eq/g and the diameter of the liquid droplet of the dispersed aqueous phase becomes not more than 10 μm.

More preferably, the tertiary amine is added into the water-in-oil emulsion within 10 minutes after the average diameter of the liquid droplets of the dispersed water phase is reduced to not more than 10 μm.

As the tertiary amine to be added, there can be mentioned triethylamine, tri-n-propylamine, tri-n-butylamine and diethylaminopyridine, triethylamine being preferred industrially in view of easy removal in the washing step.

The addition amount of the tertiary amine is from 0.001 to 1.0 mol %, preferably, from 0.01 to 0.5 mol % based on the dihydric phenol used. If it is less than 0.001 mol %, there is no substantial effect for improving the liquid separability. On the other hand, if it exceeds 1.0 mol %, it is not preferred since extracting and removing the tertiary amine in the washing step are troublesome, although the effect of improving the liquid separability can be obtained.

The temperature of polymerization in the process of the present invention is preferably 10° to 40° C. either before or after the addition of the tertiary amine, and the polymerization time in total is preferably 0.1 to 60 minutes. The highly emulsified state described above is preferred to be maintained by the high speed equipment until the tertiary amine is added. In this case, the rotational speed of the high speed agitating equipment is not restricted specifically because it depends on the size of the equipment and the type or shape of the blades, however, it is preferably 800 to 10,000 rpm, more preferably 1,000 to 9,000 rpm.

Then, the tertiary amine is added to the emulsion, however, there is no particular restriction for the mixing and stirring method upon adding the tertiary amine and it may be added to the emulsion of a high emulsified state just after passing through the emulsifying equipment. However, for promoting the coalescence of the highly emulsified emulsion and improving the liquid separability in the impurity removing step, it is preferred to employ more moderate mixing and stirring condition as compared with the specific condition of high speed employed before the addition of the tertiary amine. Specifically, a general condition usually employed in production of polycarbonate is fully adequate for the purpose.

After the tertiary amine is added, the mixture is allowed to continue the polymerization reaction and the reaction is completed when a desired molecular weight is attained. After the completion of the reaction, the aqueous phase of the reaction mixture contains a great amount of hydroxides, carbonates and chlorides of alkali metal, while the organic phase contains the tertiary amine, etc. In order to remove them, the reaction mixture is separated by standing or centrifugal separation into an aqueous phase and an organic phase, as it is or after dilution with an organic solvent or water. Subsequently, the tertiary amine and the alkali component contained in the organic phase are removed by extraction with an aqueous acidic solution of hydrochloric acid, phosphoric acid, etc. and, further, the organic phase is thoroughly washed with water till the impurities are removed. From the organic phase after the completion of purification, the organic solvent is removed by a conventional method to obtain a solid product of a high molecular weight aromatic polycarbonate.

In the present invention, unreacted dihydric phenol may sometimes remain in the liquid reaction mixture after the reaction with phosgene. However, this is not favorable since the unreacted dihydric phenol is lost when the aqueous phase is removed from the reaction mixture. Accordingly, it is preferred in such a case to employ the following procedures:

(1) the aqueous phase and the organic phase are further mixed by stirring for an extended period of time to continue the reaction until no unreacted dihydric phenol becomes noticed in the aqueous phase, and thereafter, the aqueous phase and the organic phase are separated;

(2) the reaction mixture after the reaction with phosgene is treated with a mineral acid such as hydrochloric acid and phosphoric acid to neutralize the alkali metal salt of the dihydric phenol, the unreacted alkali, the by-produced carbonate of alkali metal, etc. contained in the aqueous phase, thereby lowering the pH of the system to 8 or below to transfer the dihydric phenol into the organic phase, and then, the aqueous phase and the organic phase are separated; and (3) a small amount of the tertiary amine is added to the reaction mixture to allow the unreacted dihydric phenol to react with the low molecular weight polycarbonate oligomer having chloroformate groups, thereby consuming the unreacted dihydric phenol, and then, the aqueous phase and the organic phase are separated. In this case, it is preferred that the pH of the reaction mixture is finally adjusted to 8 or below. If the pH exceeds 8, the added tertiary amine remains in the organic phase and possibly reacts with the chloroformate groups during the polycondensation reaction in a high emulsified state to increase the amount of the tertiary amine incorporated into the polycarbonate.

Further, in the case of (3), the probability that a slight amount of the tertiary amine is incorporated into the terminal of the oligomer by urethane bonding during the reaction of unreacted dihydric phenol and the chloroformate groups becomes somewhat higher. Therefore, when the oligomer thus obtained is supplied to an emulsifying equipment together with an aqueous solution of alkali, emulsified, and added with the tertiary amine to initiate the polymerization when the average diameter of the liquid droplets of the dispersed aqueous phase is reduced to not more than 10 μm, a polycarbonate having a terminal amine content more than those obtained through (1) or (2) by the amount incorporated into the oligomer may be obtained. Such a polycarbonate may suffer from a slight coloration during the molding, but, this coloration is acceptable for practical use.

In the case of (3), the addition amount of the tertiary amine is preferably not more than 2.0 g per one liter of the reaction mixture. An amount exceeding 2.0 g is not preferred since the amount of the tertiary amine incorporated into the polycarbonate is increased to impair the heat stability of the finally obtained polycarbonate.

The polycarbonate obtained according to the present invention usually has an average molecular weight of from 10,000 to 100,000, preferably from 29,000 to 100,000, and a nitrogen content of not more than 3 ppm. Further, since the molding product thereof has not only excellent physical property inherent to the polycarbonate but also shows remarkably improved heat stability in molding at high temperature thereby obtaining molding product with less coloration, there is a merit that the field of application is further extended as compared with conventional products. In addition, although the highly emulsified water-in-oil state is formed in the production process according to the present invention, the liquid separability between the organic phase and the aqueous phase is significantly improved to extremely facilitate the washing step for removing impurity from the polymer solution after the completion of the reaction.

The present invention is to be described more specifically referring to examples but the invention is not restricted to them so long as they do not go beyond the scope of the invention.

Unless otherwise specified, "%" means "% by weight" in the examples.

Each of the measured values in the examples was determined by the following method.

(a) Average Molecular Weight (Mv)

The average molecular weight was calculated from $\eta_{sp}$ measured by using a 0.6 g/dl methylene chloride solution of the polymer at 20° C., in accordance with the following formula:

$$\eta_{sp}/C = [\eta](1 + 0.28\eta_{sp})$$

$$[\eta] = 1.23 \times 10^{-5} \, Mv^{0.83}$$

(b) Measurement for the chloroformate group concentration of the oligomer in the emulsified reaction mixture 1. Pre-treatment About 30 g of a reaction mixture from the emulsifying equipment was placed in a separation funnel containing previously prepared 50 ml of 1N hydrochloric acid solution and 120 ml of methylene chloride, and rapidly shaken (using KM-shaker, manufactured by Iwaki Co.) to neutralize the alkali component in the reaction mixture and terminate the reaction. In this instance, it was confirmed that the aqueous phase was acidic. After separation by standing still (about 5 min), the methylene chloride phase was separated and 50 ml of demineralized water was added and shaken for 5 min, followed by washing. After separating by standing still, demineralized water was added again and washing was repeated till the aqueous phase became neutral.

A methylene chloride solution containing the polymer thus obtained was heated on a hot plate (60° C.) for 30 min to remove methylene chloride and, thereafter, further dried in an air oven (60° C.) for 30 min to obtain solid material.

2. Analysis

For the resultant solid material, the amount of the terminal chloroformate group and the amount of nitrogen were measured by the following method.

(i) Measurement for the amount of the terminal chloroformate group 1.5 g of solid material was dissolved into 20 ml of methylene chloride, to which 0.1 ml of aniline was added to react with the chloroformate group. Then 5 ml of 0.05N nitric acid was added and shaken for 5 min to extract aniline hydrogen chloride into the aqueous phase. The amount of chloride ions was measured by using a chloride counter (HIRANUMA Chloride-Counter, Model CL-7) to quantitatively determine the amount of chloformate group in the sample.

(ii) Measurement for the nitrogen content

The nitrogen content was measured by using about 20 mg of the solid material by a total nitrogen analyzer (TN-10) manufactured by Mitsubishi Kasei Co.

(c) Measurement for the average diameter of liquid droplet of the dispersed aqueous phase in emulsion The emulsion was placed without dilution on a slide glass, on which a cover glass was placed with 50 $\mu$m spacer to prepare a sample.

The average diameter of the liquid droplets was measured by using a laser diffraction type dispersion analyzer (SALD-1100, manufactured by Shimazu Seisakusho).

When the average diameter measured according to the method described above was larger than 30 $\mu$m, the measurement was repeated according to the following method.

A sample was prepared in the same manner as above except that the spacer was changed to 100 $\mu$m. Then the emulsion was observed under an optical microscope and a microphotograph of the emulsion was taken. The approximate diameter of liquid droplets was determined from the microphotograph.

(d) Molding of specimen for measuring yellowness index

Molding was conducted by using an injection molding machine (M-60-SJ, manufactured by Meiki Co.) under the condition: cylinder temperature of 300° C., injection time for 10 sec, cooling time for 20 sec, number of rotation for plasticization of 100 rpm and back pressure of 10 kg/cm$^2$, to obtain a molding piece of 3.2 mm thickness (60 mm × 60 mm).

(e) Yellowness index

Yellowness index was measured by using SM-5-CH manufactured by Suga Shikenki Co.

Figure 1:
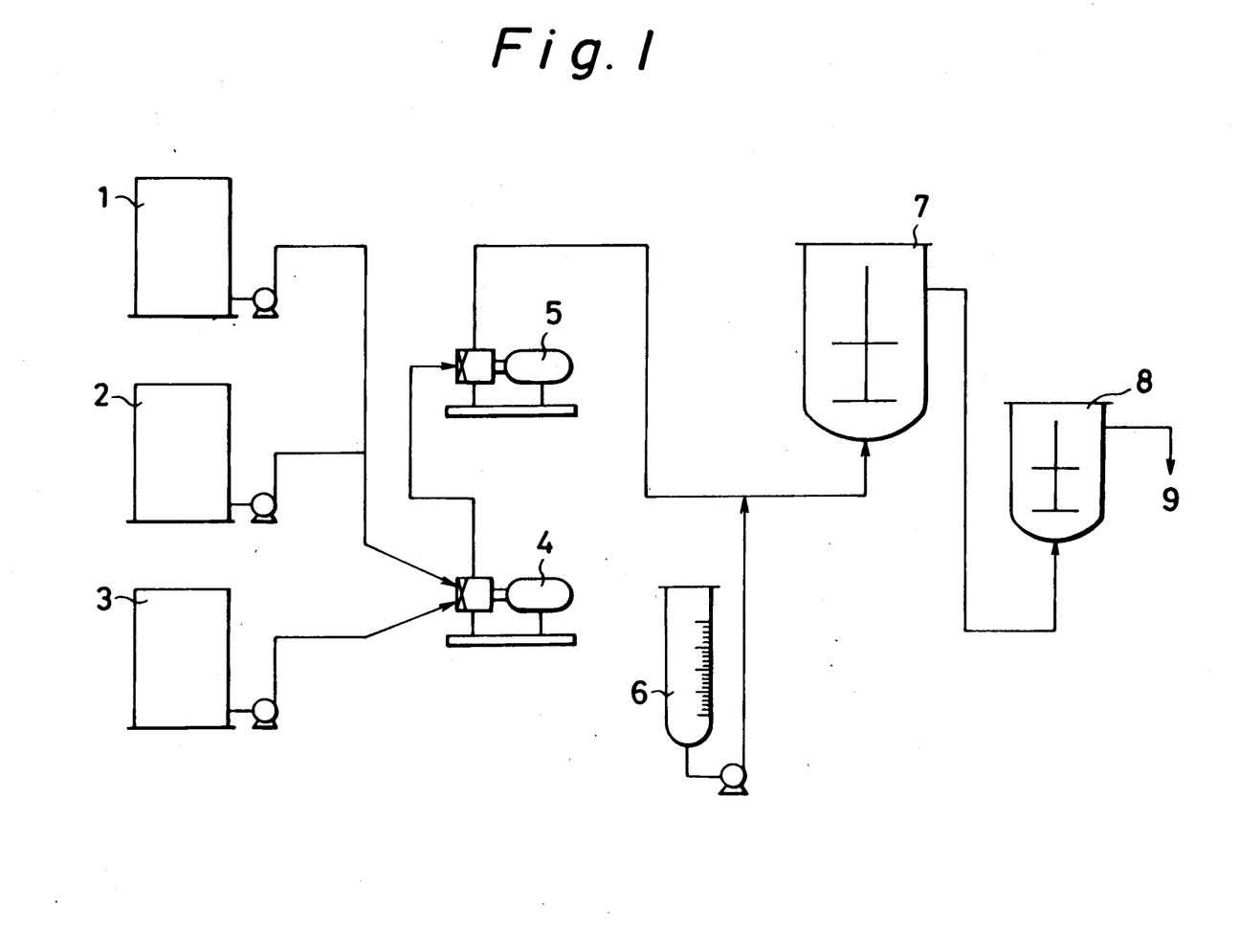
FIG. 1 is a schematic view of an apparatus for the polymerization method in Example 1 of the present invention.

FIG. 1 is a schematic view for the polymerization step in the following Example 1 but the invention is not restricted only thereto so long as it does not go beyond the scope thereof.

Reference Example 1 (Production of low molecular weight polycarbonate oligomer (1))

To a teflon (perfluorocarbon polymer) tube of 6 mm inner diameter (1 mm wall thickness) and 16 m length having at an introduction part three inlet for the following three starting materials, that is, (a) an aqueous sodium hydroxide solution of bisphenol A (a solution containing 13.5% by weight of bisphenol A prepared by dissolving 15.61 parts by weight of bisphenol A to 100 parts by weight of an aqueous 5.65 wt % sodium hydroxide solution), (b) methylene chloride and (c) phosgene, and an exit connected to a 60 liter volume stirring vessel, 53 kg/hr (about 41.7 liter/hr) of methylene chloride and 118.4 kg/hr (about 115 liter/hr) of an aqueous sodium hydroxide solution of bisphenol A were supplied and, simultaneously, phosgene was supplied at 7.80 kg/hr.

The reaction mixture from the teflon tube was introduced into the 60 liter volume stirring vessel described above (effective volume upto the overflow tube of 60 liter, two-paddle type blade, the paddle diameter/vessel diameter ratio of 0.45, equipped with buffle plates) and the temperature in the stirring vessel was maintained at 30° C. by external cooling.

At the same time, a 24 wt % solution of p-t-butylphenol (p-TBP) in methylene chloride was supplied at a rate of 1.0 kg/hr to the stirring vessel.

The reaction mixture from the stirring vessel was introduced to a separation vessel and stood still to separate into an aqueous phase and a methylene chloride solution of the oligomer.

The yield of the methylene chloride solution of the oligomer was 74 kg/hr and 725 kg of the methylene chloride solution was obtained by 10 hours' operation.

The resultant oligomer solution was heated on a hot plate (60° C.) for 30 min to remove methylene chloride. Then, it was further dried by an air oven (60° C.) for 30 min to obtain solid material. Then, the concentration of chloroformate group was measured in accordance with the measuring method for the amount of the terminal chloroformate group (b)-2(i) described above. As a result, the concentration of the chloroformate group was 0.31N.

EXAMPLE 1

The following reaction was conducted by using an apparatus, in which two emulsifying equipment ("TK pipeline homomixer-2S type" each equipped with a low viscosity turbine) were connected and the reaction solution exit of the second emulsifying equipment was led to the following two polymerization vessels connected in series.

First polymerization vessel: volume 180 liter of volume and 200 rpm of stirring speed.

Second polymerization vessel: volume 53 liter of volume and 300 rpm of stirring speed.

When the number of rotation for each of the two emulsifying equipment was adjusted to 6000 rpm and respective starting materials were supplied to the first emulsifying equipment, i.e., an oligomer solution of a chloroformate group (hereinafter referred to as CF) concentration of 0.31N obtained in the Reference Example 1 at 62 liter/hr (80 kg/hr), methylene chloride at 33 liter/hr (44 kg/hr) and 1.2N solution of sodium hydroxide at 27 liter/hr (28 kg/hr) respectively, the CF concentration at the exit of each of the emulsifying equipments was $650 \times 10^{-6}$ eq/g (exit of the first emulsifying equipment) and $400 \times 10^{-6}$ eq/g (exit of the second emulsifying equipment) based on the solid content of oligomer. The reaction mixture from the second emulsifying equipment was introduced to the first polymerization vessel, to which an aqueous 2 wt % solution of triethyl amine was continuously supplied at 0.4 kg/hr. The reaction mixture overflown from the first polymerization vessel was introduced to the second polymerization vessel and then to the washing and separation step.

8 and 12 hours after the starting of the supply to the emulsifier, the reaction mixture was collected from the exit of the second polymerization vessel, to which methylene chloride was added to adjust the solid concentration in the organic phase to 8% by weight. After shaking them in a shaking machine (KM-shaker, manufacture by Iwaki Co.) for five min, they were immersed in a thermostat at 30° C. and a time required for separation into an organic and an aqueous phase was measured. The mixture started to be separated in two phase at 50 min and 52 min respectively and completely separated at 80 min and 78 min respectively.

Further, after adjusting the solid concentration of the reaction mixture from the second polymerization vessel after 8 hours to 8% by weight with methylene chloride, the aqueous phase was separated and, successively, the organic phase was washed with a 0.2N hydrochloric acid to remove free triethyl amine and, thereafter, further washed with demineralized water for three times. A portion of the methylene chloride solution of the polycarbonate thus purified was cast on a stainless steel pad coated with teflon and formed into a dry film in a drier. Then, after sufficiently drying the film in a vacuum drier, the amount of nitrogen incorporated into the polycarbonate was measured. The amount of nitrogen was 1.2 ppm. The viscosity average molecular weight was 30100.

Meanwhile, the purified methylene chloride solution of polycarbonate was introduced together with water at about 60° C. into a stirring vessel equipped with an external circulation type wet pulverizer and then pulverized while evaporating methylene chloride by keeping the temperature inside of the vessel at 50° to 60° C. The pulverizates were partially taken out from the recycling line of the wet pulverizer and introduced continuously to a centrifugator to obtain a granular polycarbonate. The granular polycarbonate was dried in a vacuum drier (120° C., 5 mmHg) to obtain a powder with a methylene chloride concentration of less than 100 ppm.

The thus obtained powder was molded under the molding conditions as described above, to obtain a molding piece of 3.2 mm thickness (60 mm×60 mm). When the yellowness index of the molding piece was measured, it was 0.8.

COMPARATIVE EXAMPLE 1

Two "TK-pipeline homomixer" were detached from the apparatus used in Example 1, and the oligomer solution, methylene chloride, a solution of sodium hydroxide and an aqueous solution of triethylamine each in the same amount as that in Example 1 were supplied to and polymerized in the two set of first polymerization vessel and second polymerization vessel shown in Example 1. Subsequent operations were the same as those in Example 1.

However, the resultant product had a viscosity average molecular weight of only 20,500 and the amount of the nitrogen incorporated was 22.5 ppm. The average diameter for the liquid droplet in the dispersed aqueous phase at the exit of the second polymerization vessel was about 50 μm.

COMPARATIVE EXAMPLE 2

The same procedures as those in Comparative Example 1 were conducted except for supplying 2 wt % aqueous solution of triethylamine divisionally at 0.04 kg/hr to the first polymerization vessel and at 0.36 kg/hr to the second polymerization vessel.

The viscosity average molecular weight of the resultant polycarbonate was 29900 and the amount of the nitrogen in the polymer was 9.0 ppm.

When the polymer solution 8 and 12 hours after the starting of the supply was diluted to 8% by weight and shaken for about 5 min, the solution started to separate into two phases in 50 min and 50 min respectively and showed complete separation at 80 min and 75 min respectively.

The yellowness index of the molding piece (3.2 mm thickness) obtained by injection molding in the same manner as in Example 1 was 4.0.

EXAMPLES 2-9, COMPARATIVE EXAMPLE 3

Polymerization was conducted by changing the number of rotation of the two pipeline homomixers, the concentration of the aqueous sodium hydroxide solution and the amount of an aqueous 2 wt % solution of triethylamine to be added to the first polymerization vessel in Example 1, respectively, as shown in Table 1. The time required for the separation into two phases, the amount of nitrogen in the polymer and the yellowness index of the molding piece were measured. The results are shown in Table 1.

EXAMPLES 10-12, COMPARATIVE EXAMPLE 4

The same procedures as those in Example 1 were repeated except for changing the number of rotation of the two pipeline homomixers, the concentration and the amount supplied of the aqueous sodium hydroxide solution as shown in Table 2. The time required for the separation into two phases, the amount of nitrogen in the polymer and the yellowness index of the molding piece were measured. The results are shown in Table 2.

EXAMPLES 13-15, COMPARATIVE EXAMPLES 5-6

The same procedures as those in Example 1 were repeated except for using only the first pipeline homomixer (the second mixer was used as a by-pass), the number of rotation of the emulsifying equipment and the concentration and the amount supplied of an aqueous sodium hydroxide solution. The time required for the separation into two phases, the amount of nitrogen in the polymer and the yellowness index of the injection molded plate were measured. The results are shown in Table 3.

COMPARATIVE EXAMPLE 7

The number of rotation of the two emulsifying equipment was adjusted to 6000 rpm and highly emulsified state was attained quite in the same procedures as in the examples. The reaction mixture from the emulsifying equipment was introduced to the first polymerization vessel and the second polymerization vessel in the same way as in Example 1. Different from Example 1, triethylamine was not added to any of the polymerization vessels.

The reaction mixture was collected from the exit of the second polymerization vessel at 8 hours and 12 hours after starting the supply to the emulsifying equipment. After adjusting the solid concentration in the organic phase to 8% by weight, shaking and immersing in a thermostat at 30° C. in the same way as in Example 1, the separation time for both of the phases was examined but no separation was caused after elapse of 5 hours.

Further, the reaction mixture collected at the exit of the second polymerization vessel was diluted so that the solid content in the organic phase was 8 wt % and then introduced to the washing and separation step in the same way as in Example 1, but it could not be separated at all.

Reference Example 2 (Production of low molecular weight polycarbonate oligomer (2))

The same procedures as those in Reference Example 1 were repeated using the same apparatus as in Reference Example 1, except for changing the addition amount of p-TBP to 1.6 kg/hr with 24 wt % of methylene chloride solution, to obtain a low molecular weight polycarbonate oligomer at CF concentration of 0.30N.

EXAMPLE 16

An oligomer with the CF concentration at the exit from the second emulsifying equipment of $450 \times 10^{-6}$ eq/g was obtained by the same procedures as those in Example 1 except for using the oligomer obtained in the Reference Example 2. Then, the oligomer was introduced into the first and the second polymerization vessels and polymerized in the same manner as in Example 1.

The polycarbonate solution after the washing step was pulverized in the same way as in Example 1 to obtain a polycarbonate powder. The polycarbonate had a molecular weight of 21200, and the amount of nitrogen incorporated was 1 ppm, and the yellowness index after molding was 0.9

When the time required for separating into the organic phase and the aqueous phase for the reaction mixture at the exit of the second polymerization vessel was measured as in Example 1, the time for the separation and the time for the complete separation were 20 min and 30 min after 8 hours and 22 min and 28 min after 12 hours, respectively.

TABLE 1

|  | Ex. 1 | Ex. 2 | Ex. 3 | Comp. Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Pipeline homomixer (rpm) |  |  |  |  |  |  |  |  |  |  |
| First emulsifying equipment (rpm) | 6,000 | 5,000 | 4,000 | 2,000 | 6,000 | 6,000 | 6,000 | 6,000 | 6,000 | 6,000 |
| Second emulsifying equipment (rpm) | 6,000 | 5,000 | 4,000 | 2,000 | 6,000 | 6,000 | 6,000 | 6,000 | 6,000 | 6,000 |
| Concentration of aqueous sodium hydroxide solution (N) | 1.2 | 1.2 | 1.2 | 1.2 | 1.2 | 1.2 | 1.2 | 1.2 | 1.2 | 1.2 |
| Addition amount of an aqueous 2 wt % solution of triethylamine (kg/hr) | 0.4 | 0.4 | 0.4 | 0.4 | 0.04 | 0.1 | 0.2 | 0.8 | 1.2 | 2.0 |
| CF concentration at the exit of the emulsifying equipment ($\times 10^{-6}$ eq/g solid) |  |  |  |  |  |  |  |  |  |  |
| First emulsifying equipment | 650 | 670 | 720 | 800 | 660 | 650 | 670 | 690 | 650 | 660 |
| Second emulsifying equipment | 400 | 410 | 450 | 750 | 400 | 400 | 390 | 450 | 380 | 410 |
| Time for interface separation (after 8 hr) |  |  |  |  |  |  |  |  |  |  |
| Time till the start of separation (min) | 50 | 50 | 55 | 50 | 80 | 70 | 50 | 50 | 55 | 50 |
| Time for complete separation (min) | 80 | 70 | 80 | 75 | 120 | 100 | 80 | 70 | 70 | 65 |
| Viscosity average molecular weight | 30100 | 30000 | 30200 | 26300 | 29800 | 30100 | 30000 | 30200 | 30100 | 29800 |
| Nitrogen amount in polymer (ppm/solid) | 0.8 | 1.0 | 1.2 | 15 | 0.8 | 0.9 | 1.0 | 1.2 | 1.3 | 2.0 |
| Yellowness index (molding piece) | 0.8 | 1.2 | 1.2 | 5.0 | 1.0 | 0.9 | 1.2 | 1.0 | 1.5 | 1.8 |
| Average diameter ($\mu$m) of liquid droplet of the dispersed aqueous phase at the exit of the second emulsifying equipment. | 2 | 3 | 5 | 30 | 2 | 2 | 2 | 2 | 2 | 2 |

TABLE 2

|  | Comp. Ex. 4 | Ex. 10 | Ex. 11 | Ex. 12 |
|---|---|---|---|---|
| Pipeline homomixer (rpm) | | | | |
| First emulsifying equipment (rpm) | 6,000 | 6,000 | 6,000 | 6000 |
| Second emulsifying equipment (rpm) | 6,000 | 6,000 | 6,000 | 6,000 |
| Aqueous sodium hydroxide solution supplied | | | | |
| Concentration (N) | 0.6 | 1.5 | 1.5 | 2.0 |
| Amount supplied liter/hr | 54 | 27 | 21.6 | 16.2 |
| Addition amount of an aqueous 2 wt % solution of triethylamine (kg/hr) | 0.4 | 0.4 | 0.4 | 0.4 |
| CF concentration at the exit of the emulsifying equipment | | | | |
| First emulsifying equipment ($\times 10^{-6}$ eq/g) | 800 | 480 | 520 | 260 |
| Second emulsifying equipment ($\times 10^{-6}$ eq/g) | 780 | 360 | 410 | 190 |
| Time for interface separation (after 8 hr) | | | | |
| Time till the start of separation (min) | 30 | 60 | 55 | 50 |
| Time for complete separation (min) | 40 | 100 | 80 | 75 |
| Viscosity average molecular weight | 21500 | 29700 | 30100 | 30000 |
| Nitrogen amount in polymer (ppm/solid) | 20.3 | 0.9 | 0.9 | 1.0 |
| Yellowness index of molding plate | 5.1 | 0.9 | 1.1 | 1.0 |
| Average diameter ($\mu$m) of liquid droplet of the dispersed aqueous phase at the exit of the second emulsifying equipment | 30 | $\leq 2$ | <2 | <2 |

TABLE 3

|  | Comp. Ex. 5 | Ex. 13 | Ex. 14 | Comp. Ex. 6 | Ex. 15 |
|---|---|---|---|---|---|
| Pipeline homomixer (rpm) | 6,000 | 6,000 | 6,000 | 4,000 | 4,000 |
| Amount of methylene chloride supplied (liter/hr) | 33 | 33 | 33 | 33 | 33 |
| Aqueous sodium hydroxide solution supplied | | | | | |
| Concentration (N) | 1.2 | 2.0 | 2.0 | 1.2 | 2.0 |
| Amount supplied liter/hr | 27.0 | 16.2 | 27.0 | 27.0 | 16.2 |
| Pipeline homomixer exit CF concentration ($\times 10^{-6}$ eq/g) | 670 | 280 | 210 | 750 | 320 |
| Time for interface separation (after 8 hr) | | | | | |
| Time till the start of separation (min) | 25 | 55 | 75 | 25 | 50 |
| Time for complete separation (min) | 40 | 80 | 120 | 40 | 75 |
| Viscosity average molecular weight | 23000 | 29900 | 30100 | 21200 | 30200 |
| Nitrogen amount in polymer (ppm/solid) | 18.2 | 0.9 | 0.8 | 20.5 | 1.0 |
| Yellowness index of molding plate | 4.9 | 1.0 | 0.8 | 5.2 | 1.0 |
| Average diameter ($\mu$m) of liquid droplet of the dispersed aqueous phase at the exit of the second emulsifying equipment | 30 | 2 | <2 | 30 | 2 |

What is claimed is:

1. A process for producing an aromatic polycarbonate which comprises the steps of:
   a low molecular weight polycarbonate oligomer having chloroformate groups by subjecting an aqueous alkali solution of a compound having two phenolic hydroxyl groups and phosgene to reaction in an organic solvent, and
   polymerizing the oligomer in a water-in-oil emulsified state in the presence of an alkali and a tertiary amine, the tertiary amine being added into the water-in-oil emulsion after the average diameter of the liquid droplets of dispersed water phase in the water-in-oil emulsion is reduced to not more than 10 μm.

2. A process according to claim 1, wherein the tertiary amine is added into the water-in-oil emulsion after the concentration of the chloroformate group reaches not more than $600 \times 10^{-6}$ eq/g based on the amount of oligomer.

3. A process according to claim 1, wherein the tertiary amine is a trialkylamine.

4. A process according to claim 1 or 3, wherein the tertiary amine is triethylamine.

5. A process according to claim 1, wherein the amount of the tertiary amine added is 0.001 to 1 mol % based on the amount of the compound having two phenolic hydroxyl groups.

6. A process according to claim 1, wherein the amount of the tertiary amine added is 0.001 to 0.5 mol % based on the amount of the compound having two phenolic hydroxyl groups.

7. A process according to claim 1, wherein the low molecular weight polycarbonate oligomer mainly comprises oligomers having a degree of polymerization from 1 to about 10.

8. A process according to claim 1, wherein the concentration of the chloroformate group in the low molecular weight polycarbonate oligomer is from $800 \times 10^{-6}$ to $2000 \times 10^{-6}$ eq/g based on the oligomer.

9. A process according to claim 1, wherein the alkali is an alkali metal hydroxide.

10. A process according to claim 1, wherein the ratio between the organic phase and the aqueous phase in the water-in-oil emulsion is 1:0.05 to 1.0 by volume.

11. A process according to claim 1, wherein the alkali concentration of the aqueous phase in the water-in-oil emulsion is 0.5 to 4N.

12. A process according to claim 1, wherein the oligomer concentration in the organic phase in the water-in-oil emulsion is so adjusted that the concentration of the produced polycarbonate therein is in a range from 8 to 30% by weight.

13. A process according to claim 1, wherein the water-in-oil emulsified state is obtained with high speed agitating equipment.

14. A process according to claim 13, wherein the rotational speed of the high speed agitating equipment is 800 to 10,000 rpm.

15. A process according to claim 1, wherein the tertiary amine is added into the water-in-oil emulsion within 10 minutes after the average diameter of the liquid droplets of the dispersed water phase in the water-in-oil emulsion is reduced to not more than 10 μm.

16. A process according to claim 1, wherein the tertiary amine is added to the oligomer having a chloroformate group concentration in the range from $100 \times 10^{-6}$ to $600 \times 10^{-6}$ eq/g based on the oligomer.

17. A process according to claim 1, wherein the average diameter of liquid droplets of the dispersed water phase in the water-in-oil emulsion is 0.01 to 10 μm.

18. A process according to claim 1, wherein the compound having two phenolic hydroxyl groups is at least one compound selected from the group consisting of 2,2-bis(4-hydroxyphenyl)propane, 2,2-bis(4-hydroxy-3,5-dimethylphenyl)propane and 2,2-bis(4-hydroxy-3,5-dibromophenyl)propane.

19. A process according to claim 1, wherein the organic solvent is a chlorinated aliphatic hydrocarbon or a chlorinated aromatic hydrocarbon.

20. A process according to claim 1, wherein the organic solvent is methylene chloride.

21. A process according to claim 1, wherein the amount of phosgene is from 1.05 to 1.4 mol to one mol of the compound having two phenolic hydroxyl groups.

22. A process according to claim 1, wherein the reaction mixture from the reaction between the compound having two phenolic hydroxyl groups and phosgene is subjected to removal of the water phase therefrom, and the resultant organic solution of the low molecular weight polycarbonate oligomer is then formed into the water-in-oil emulsified state after mixing the organic solution with an aqueous alkali solution.

23. A process according to claim 1, wherein the aromatic polycarbonate produced has a viscosity average molecular weight, Mv, of not less than 10,000 and a nitrogen content of not more than 3 ppm, wherein the average viscosity molecular weight is calculated from $\eta_{sp}$ measured using a 0.6 g/dl methylene chloride solution of the polymer at 20° C., in accordance with the formulae:

$$\eta_{sp}/C = [\eta](1 + 0.28\, \eta_{sp})$$

$$[\eta] = 1.23 \times 10^{-5}\, Mv^{0.83}.$$

24. A process according to claim 1, wherein the polymerization temperature of the oligomer is 10° to 40° C.

25. A process according to claim 1, wherein polymerization time of the oligomer is 0.1 to 60 minutes.

* * * * *